US 9,402,192 B2

(12) United States Patent
Luo et al.

(10) Patent No.: US 9,402,192 B2
(45) Date of Patent: Jul. 26, 2016

(54) METHOD FOR CALIBRATING ANTENNA RECIPROCITY IN A BASE STATION OF WIRELESS NETWORK AND A DEVICE THEREOF

(75) Inventors: Qinglin Luo, PuDong Jinqiao Shanghai (CN); Jing Shi, PuDong Jinqiao Shanghai (CN); Yan Zhao, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 368 days.

(21) Appl. No.: 13/810,487

(22) PCT Filed: Jul. 15, 2011

(86) PCT No.: PCT/IB2011/001866
§ 371 (c)(1),
(2), (4) Date: Jan. 16, 2013

(87) PCT Pub. No.: WO2012/014066
PCT Pub. Date: Feb. 2, 2012

(65) Prior Publication Data
US 2013/0114459 A1 May 9, 2013

(30) Foreign Application Priority Data
Jul. 16, 2010 (CN) .......................... 2010 1 0229376

(51) Int. Cl.
*H04B 17/12* (2015.01)
*H04B 7/02* (2006.01)
(Continued)

(52) U.S. Cl.
CPC ............... *H04W 24/00* (2013.01); *H04B 7/024* (2013.01); *H04B 17/12* (2015.01); *H04W 24/08* (2013.01)

(58) Field of Classification Search
CPC ..... H01Q 3/267; H01Q 1/246; H01Q 3/2605; H01Q 3/26; H01Q 1/28; H01Q 3/30; H01Q 21/08; H01Q 21/205; H01Q 25/00; H01Q 13/02; H01Q 3/08; H01Q 21/0025; H01Q 3/2611; H01Q 15/02; H01Q 19/08
See application file for complete search history.

(56) References Cited

U.S. PATENT DOCUMENTS 7,392,015 B1 6/2008 Farlow et al.
8,498,669 B2 * 7/2013 Naguib et al. ............. 455/562.1
(Continued)

FOREIGN PATENT DOCUMENTS

CN 101351972 A 1/2009
CN 101500248 A 8/2009
(Continued)

OTHER PUBLICATIONS

TD Tech, "On the Aantenna Calibration in TDD CoMP," 3rd Generation Partnership Project (3GPP), 3GPP TSG RAN WG1 meeting #60, R1101016, 5 pages, San Francisco, USA, Feb. 22-26, 2010.
(Continued)

*Primary Examiner* — Anthony Addy
*Assistant Examiner* — Martin Chang
(74) *Attorney, Agent, or Firm* — Fay Sharpe, LLP (57) ABSTRACT

The present invention provides a method and device for calibrating antenna reciprocity via OTA in a base station of wireless network, and the method comprises: determining, based on a predefined rule, a plurality of calibrating UEs out of a plurality of UEs, and antennas, to be calibrated by the plurality of calibrating UEs, of the plurality of base stations, wherein the plurality of calibrating UEs are configured to calibrate antennas of the plurality of base stations; and calibrating, according to the determined calibration relationship, the antennas reciprocity of the plurality of base stations based on the plurality of calibrating UEs. With the method of present invention, communication channel model can be calibrated effectively so as to enhance antenna reciprocity in CoMP scenario.

13 Claims, 5 Drawing Sheets

(51) Int. Cl.
*H04W 24/08* (2009.01)
*H04W 24/00* (2009.01)

(56) References Cited

U.S. PATENT DOCUMENTS

| | | | |
|---|---|---|---|
| 2005/0227628 A1 | 10/2005 | Inanoglu | |
| 2007/0099573 A1 | 5/2007 | Naguib et al. | |
| 2010/0117890 A1* | 5/2010 | Vook et al. | 342/174 |
| 2010/0150013 A1* | 6/2010 | Hara et al. | 370/252 |

FOREIGN PATENT DOCUMENTS

| | | |
|---|---|---|
| JP | 2005-130315 | 5/2005 |
| JP | 2005-257298 | 9/2005 |
| JP | 2007-531467 | 11/2007 |
| WO | WO 2010/053684 A2 | 5/2010 |

OTHER PUBLICATIONS

Alcatel-Lucent Shanghai Bell et al., "Antenna Array Calibration for TDD CoMP," 3$^{rd}$ Generation Partnership Project (3GPP), 3GPP TSG RAN WG1 Meeting #59bis, R1-100427, 5 pages, Valencia, Spain, Jan. 10-22, 2010.

Alcatel-Lucent Shanghai Bell et al., "Simultaneous eNB and UE Reciprocity Calibration," 3$^{rd}$ Generation Partnership Project (3GPP), 3GPP TSG RAN WG1 Meeting #60, 5 pages, San Francisco, USA, Feb. 22-26, 2010.

International Search Report for PCT/IB2011/001866 dated Jan. 19, 2012.

Samsung, "Antenna calibrations for TDD CoMP", 3GPP TSG RAN WG1 Meeting #60, R1-101177, Feb. 26, 2010.

Huang, Fan, et al., Performance Analysis of Antenna Calibration in Coordinated Multi Point Transmission System, Vehicular Technology Conference (VTC 2010-Spring), 2010 IEEE 71$^{st}$, May 19, 2010.

Shi, Jing, et al., "An efficient method for enhancing TDD over the air reciprocity calibration", Wireless Communications and Networking Conference (WCNC), 2011 IEEE, Mar. 2011, pp. 339-344.

Alcatael-Lucent Shanghai Bell, et al., Simultaneous eNB and UE Reciprocity Calibration, 3GPP R1-100932, Feb. 16, 2010.

\* cited by examiner

METHOD FOR CALIBRATING ANTENNA RECIPROCITY IN A BASE STATION OF WIRELESS NETWORK AND A DEVICE THEREOF

FIELD OF THE INVENTION

The present invention relates to a wireless network, particularly to a method for calibrating the antenna of a CoMP (cooperative multi-point processing) base station in a base station of wireless network and a device thereof the present invention Base is configured to over-the-air calibration CoMP Base antennas.

BACKGROUND OF THE INVENTION

Channel reciprocity, i.e. characteristics of frequency symmetry for uplink/downlink, have a bright prospect of application in TDD (Time Division Duplex) system for LTE-A (Advanced-Long Term Evolution). The hypothesis of reciprocity of uplink/downlink is widely recognized in the industry, and is utilized to conduct channel estimation effectively. However, in practical application, due to the difference of RF Circuit between receiver and transmitter, especially the difference of RF Circuit between receiver and transmitter on base station side, hence, assurance of reciprocity between uplink and downlink in TDD system is difficult to be kept. For a system with a reciprocity between uplink and downlink based on TDD, system performance is sensitive to the tolerance between uplink and downlink channel, and even a little tolerance between uplink and downlink channel might result in a most serious performance degradation. Thus, reciprocity calibration of the TDD system draws attention of the industry.

Without the requirement for extra hardware equipment, the calibration of an OTA (over-the-air) interface of the TDD system with a reciprocity between downlink and uplink turns out to be an effective approach to guarantee reciprocity of uplink and downlink channel of the TDD system.

R1-094623 proposed an OTA calibrating method for TDD (Time Division Duplexing) CoMP systems, which can eliminate the requirement of the resource-consuming reciprocity calibration for each transceiver of a CoMP eNB. But analysis in R1-101016 shows that the quality of OTA calibration is limited by the user equipment's (UE) channel quality. In CoMP, the UE needs to measure all its channels from/to all the CoMP eNBs relevant thereto. With merely a portion of the above channels, if not all, calibration effect would be poor, thus directly resulting in degradation of CoMP performance.

Additionally, for current CoMP, the conventional over-the-air calibration requires the participating UE(s) to be able to accurately measure the downlink and uplink channels to all eNBs in the CoMP cluster to which the UE belongs. This requirement proves to be difficult in CoMP practice because the UE could be at the edge of at least one CoMP cell if not at the edge of all the CoMP cells. That may mean poor calibration performance of the air interface channels due to the inaccurate measurement.

Therefore, there still exist some issues in the prior art, such as how to preferably select UE(s), how to configure the selected UE(s) to calibrate the antenna(s) configured on the CoMP base station. Especially for a CoMP TDD system, there is still needed a solution about UE-selecting and calibration for reciprocity of the matrix channel between the selected UE(s) and the CoMP base station related thereto.

SUMMARY OF THE INVENTION

In view of the deficiency in the background, the present invention provides a method for calibrating antenna reciprocity in a base station of wireless network. The method may be applicable to selection of calibrating UE(s) for calibrating antennas configured for the CoMP base stations in a CoMP scenario and to configuration of antennas, of the CoMP base station, for the selected UE(s) to calibrate, thus enabling CoMP base stations to calibrate, based on the selected UE, reciprocity of the channel matrix.

According to one embodiment of the present invention, there is provided a method of calibrating antenna reciprocity in a base station of wireless network, wherein said base station is one of a plurality of base stations configured to conduct a cooperative multi-point processing, the method comprising: determining, based on a predefined rule, a plurality of calibrating user equipments out of a plurality of user equipments, and antennas, to be calibrated by said plurality of calibrating user equipments, of said plurality of base stations, wherein, said plurality of calibrating user equipments are configured to calibrate antennas of said plurality of base stations and said predefined rule is that the number L of antennas of said plurality of calibrating user equipments, the number K of antennas configured for said plurality of base stations and to be calibrated by the antenna of each of said plurality of calibrating user equipments, and the number M of the antennas of said plurality of base stations satisfy the relation of $KL \geq M+L-1$; and the criteria for channel quality between said plurality of calibrating user equipments and the antennas configured for said plurality of base stations is above a threshold; calibrating, according to the determined calibration relationship, the antennas reciprocity of said plurality of base stations based on said plurality of calibrating user equipments, wherein, said calibration relationship is the correspondence between said plurality of calibrating user equipments and the antennas, to be calibrated respectively by said plurality of calibrating user equipments, of said plurality of base stations.

In another embodiment of the present invention, the above calibrating step further comprises: determining the ratio of the reciprocity error of said plurality of base stations relative to that of a first one among said plurality of calibrating user equipments, according to the ratio of the reciprocity error of said plurality of base stations to that of said plurality of calibrating user equipments; generating a calibration weight matrix for the uplink channel on said base station side, according to the ratio of the reciprocity error of said plurality of base stations relative to that of the first one among said plurality of calibrating user equipments; determining a calibrated transposed matrix for the uplink channel, according to the calibration weight matrix for the uplink channel on said base station side and a transposed matrix for the uplink channel.

In another embodiment of the present invention, the above calibrating step further comprises: determining the ratio of reciprocity error of said plurality of base stations relative to that of a first one among the antennas configured for said plurality of base stations, according to the ratio of the reciprocity error of said plurality of base stations to that of said plurality of calibrating user equipments; generating a calibration weight matrix for the uplink channel on said base station side, according to the ratio of the reciprocity error of said plurality of base stations relative to that of the first one among the antennas configured for said plurality of base stations; determining a calibrated transposed matrix for the uplink channel, according to the calibration weight matrix for the uplink channel on said base station side and a transposed matrix for the uplink channel.

According to yet another embodiment of the present invention, there is provided a device for calibrating antenna reciprocity in a base station of wireless network, wherein said base station is one of a plurality of base stations configured to conduct a cooperative multi-point processing, the device comprising: a calibrating-UE determining unit, configured to determine, based on a first predefined rule, antennas of a plurality of calibrating user equipments out of a plurality of user equipments, wherein the antennas of said plurality of calibrating user equipments are configured to calibrate antennas of said plurality of base stations and said first predefined rule is that the criteria for channel quality between said plurality of calibrating user equipments and the antennas configured for said plurality of base stations is above a threshold; a calibration relationship determining unit, configured to determine, based on a second predefined rule, antennas, to be calibrated respectively by the antennas of said plurality of calibrating user equipments, of said plurality of base stations, wherein said second predefined rule is that the number L of the antennas of said plurality of calibrating user equipments, the number K of antennas configured for said plurality of base stations and to be calibrated by the antenna of each of said plurality of calibrating user equipments, and the number M of the antennas of said plurality of base stations satisfy the relation of $KL \geq M+L-1$; a calibration unit, configured to calibrate, according to the determined calibration relationship, the antennas reciprocity of said plurality of base stations based on said plurality of calibrating user equipments, wherein said calibration relationship is the correspondence between said plurality of calibrating user equipments and the antennas, to be calibrated respectively by said plurality of calibrating user equipments, of said plurality of base stations.

In still another embodiment of the present invention, the above calibration unit further comprises: a first reciprocity-error ratio determining unit, configured to determine the ratio of reciprocity error of said plurality of base stations relative to that of a first one among said plurality of calibrating user equipments, according to the ratio of the reciprocity error of said plurality of base stations to that of said plurality of calibrating user equipments; a first BS-side uplink-channel calibration-weight-matrix generating unit, configured to generate a calibration weight matrix for the uplink channel on said base station side, according to the ratio of the reciprocity error of said plurality of base stations relative to that of the first one among said plurality of calibrating user equipments; a first uplink-channel transposed matrix generating unit, configure to determine a calibrated transposed matrix for the uplink channel, according to the calibration weight matrix for the uplink channel on said base station side and a transposed matrix for the uplink channel.

In still another embodiment of the present invention, the above calibration unit further comprises: a second reciprocity-error ratio determining unit, configured to determine the ratio of reciprocity error of said plurality of base stations relative to that of a first antenna among the antennas configured for said plurality of base stations, according to the ratio of the reciprocity error of said plurality of base stations to that of said plurality of calibrating user equipments; a second BS-side uplink-channel calibration-weight-matrix generating unit, configured to generate a calibration weight matrix for the uplink channel on said base station side, according to the ratio of the reciprocity error of said plurality of base stations relative to that of the first antenna among the antennas configured for said plurality of base stations; a second uplink-channel transposed matrix generating unit, configured to determine a calibrated transposed matrix for the uplink channel, according to the calibration weight matrix for the uplink channel on said base station side and a transposed matrix for the uplink channel.

In the method of the present invention, a plurality of calibrating UEs are determined according to channel quality criteria, and the antennas reciprocity of a plurality of base stations is calibrated based on the determined plurality of calibrating UEs and in accordance to the calibration relationship between the antennas of the plurality of UEs and that of the plurality of CoMP base stations, thus rendering a brand new reciprocity calibration solution for TDD CoMP scenario so as to enhance the flexibility for selection of the calibrating UEs and also improve the accuracy of channel measurement and reciprocity calibration as compared to the reciprocity calibration conducted with only one calibrating UE based thereon. It could be achieved by experiments that: as compared with the conventional OTA calibration, by means of the calibrating method of some embodiments of the present invention, the reciprocity performance gain may be accomplished by averagely over 21% for cells, and by over 23% for cell edge.

The above-mentioned experiments are made under experimental conditions in accordance to LTE-R10 standard, with experimental parameters listed in Table 1:

TABLE 1

| reciprocity calibration test parameters | |
|---|---|
| Number of BS antennas | 4 |
| Number of UE antennas | 2 |
| BS antenna separation | 0.5 |
| UE antenna separation | 0.5 |
| Antenna polarization | Non-polarized |
| Total number of cells in the system | 57, wrap around |
| Number of cells in a CoMp cluster | 3 |
| SCM channel | UMi |
| UE velocity | 3 km/h |
| Average number of users per cell | 10 |
| Channel quality threshold for calibrating UE | 10 dB |
| SRS power boosting | 6 dB |

The results for the above test are reported as below:

TABLE 2

| reciprocity calibration test results | | |
|---|---|---|
| | Average throughput | Cell edge throughput |
| Ideal Reciprocity | 6.2228 | 0.1697 |
| Self Calibration with residual error 1 dB, 10 degree | 3.6113 | 0.1039 |
| Conventional OTA scheme, 3 Calibrating UEs, with Calibration Interval = 5 ms | 3.9361 | 0.1108 |
| Proposed OTA scheme, 2 Calibrating UEs, with Calibration Interval = 5 ms | 4.7482 | 0.1367 |
| Hybrid of Proposed Scheme and Self-Calibration, 2 Calibrating UEs, with Calibration Interval = 5 ms | 5.1002 | 0.1408 |

Additionally, it is not needed, for calibration method of the present invention, to add extra hardware equipment to base station or UE, and it can independently fulfill the reciprocity calibration of the CoMP base station with the self-calibration in conventional base stations replaced to some extent.

Moreover, according to a calibration method of another embodiment of the present invention, the calibration method in the embodiments of the present invention may be used, in combination with the self-calibration in traditional base stations, to achieve better calibration performance (as shown in Table 2).

BRIEF DESCRIPTION OF THE DRAWINGS

Features, aspects and advantages of the present invention will become more obvious by reading the following description of non-limiting embodiments with the aid of appended drawings.

Wherein, same or similar reference numerals refer to the same or similar device (module) or step of method.

DETAILED DESCRIPTION OF EMBODIMENTS

Reciprocity based MIMO is of most interest for TDD downlink transmission because an eNB has higher computation power than a UE. Moreover, it has access to all users' channel information and thus can perform globally optimum precoding with the full channel matrix taken into account. Therefore, focus will be applied mainly on a SU/MU MIMO downlink channel in some of the embodiments of the present invention as follows.

Figure 1:
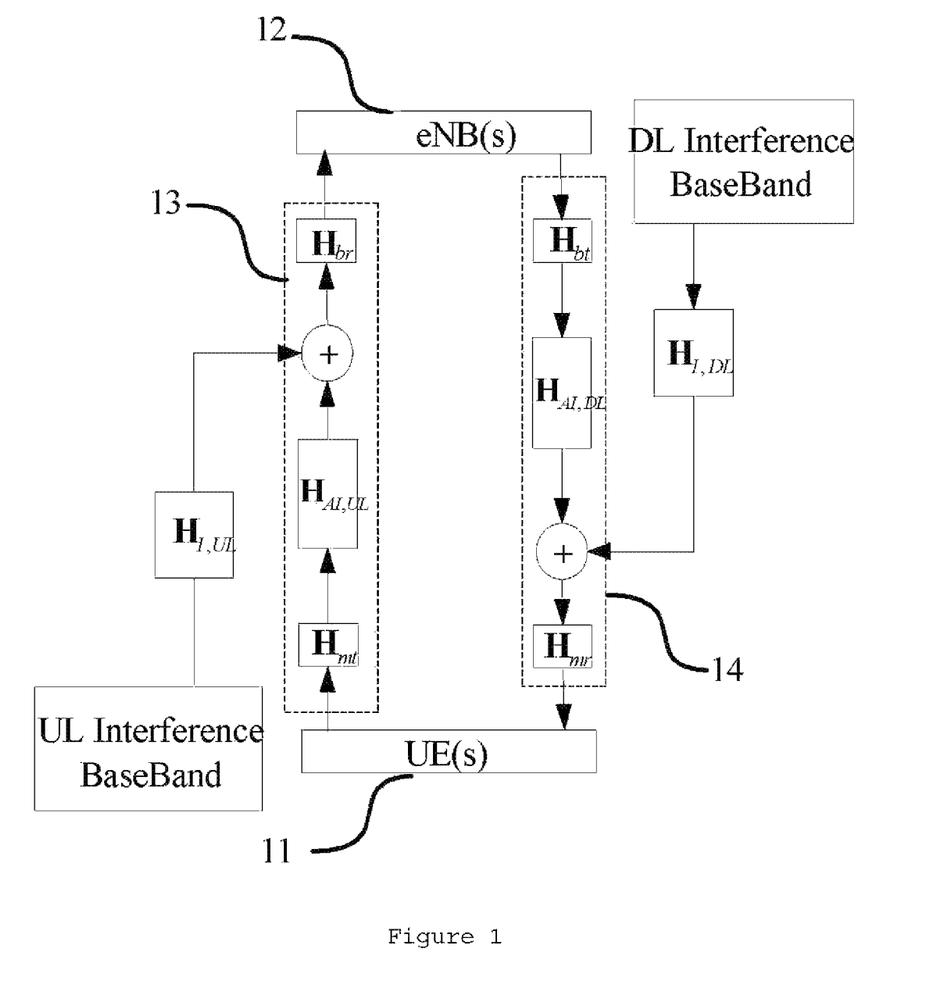
FIG. 1 illustrates the block diagram of a system model capable of reciprocity according to one embodiment of the present invention.

FIG. 1 illustrates the block diagram of a system model capable of reciprocity according to one embodiment of the present invention, the uplink channel model 13 and downlink channel model 14, as shown in FIG. 1, represent the matrix channel among at least one UE 11 and at least one base station 12 (schematically illustrated by only one channel in the Figure), wherein uplink channel model 13 may also be the object to which at least portion of embodiments of method according to the present invention may mainly apply.

As shown in FIG. 1, various reciprocity errors may take effect in the system. In the model of the system, H denotes matrix channel response, subscript 'b' denotes base station or eNB, 'm' denotes user equipment (e.g. UE), 'AI' denotes air interface, 'UL' and 'DL' denote uplink and downlink respectively, 't' and 'r' denote transmitter and receiver, respectively. The interference asymmetry can be compensated via whitening filtering at both sides. In the following, description will be concentrated on the estimation and calibration of the RF mismatch type of reciprocity errors according to some embodiments of the present invention hereinafter.

In the system shown in FIG. 1, generally, a wireless transmitter may be very different, in terms of RF circuitry, from a receiver (with $H_{br}$ and $H_{bt}$ to be channel response model thereof). By including both the eNB and the UE transmitter/receiver circuitry responses, the baseband to baseband channel responses can be formulated as:

$$H_{DL} = H_{mr} H_{AI,DL} H_{bt}$$

$$H_{UL} = H_{br} H_{AI,UL} H_{mt} \quad (1)$$

The reciprocity error can be formulated as follows:

$$E_m = H_{mt} H_{mr}^{-1} = \text{diag}(e_{m,1}, e_{m,2}, \ldots, e_{m,M})$$

$$E_b = H_{bt} H_{br}^{-1} = \text{diag}(e_{b,1}, e_{b,2}, \ldots, e_{b,N})$$

where $E_m$ is reciprocity error at the mobile station side, and $E_b$ is reciprocity error at the eNB side, $(\cdot)^{-1}$ means matrix inverse operation. Apply the above formulations into above equations (1), respectively. The effective downlink and uplink channel can be derived as follows:

$$H_{DL} = E_m^{-1} H_{UL}^T E_b \quad (2)$$

Such equations (2) models the reciprocity of the baseband to baseband uplink and downlink channels with RF mismatches.

The target of over-the-air reciprocity error estimation and calibration is to estimate eNB side reciprocity error $E_b$ and UE side reciprocity error $E_m$ from over-the-air baseband to baseband measurements of $H_{DL}$ and $H_{UL}$, and compensate the above error back to the user signals so as to guarantee the MIMO performance.

Of course, those skilled in the art could readily appreciate, for cooperated multipoint joint processing (CoMP), a plurality of CoMP base stations can be regarded as a super eNB, and a plurality of CoMP UEs can be regarded as a super UE. This will not impact the above reciprocity error modeling.

For practical systems, $H_{DL}$ and $H_{UL}$ are measurable via pilot signaling, for example, downlink CSI-RS and uplink SRS in 3GPP LTE-A systems. Thus, the following equation (3) is left with two unknown matrices $E_b$ and $E_m$. And the following embodiments of the present invention will be described with $E_b$ and $E_m$ remaining.

It should be noted that: $E_b$ and $E_m$ are both diagonal matrices. Without loss of generality, assume that all elements of $H_{UL}$ are non-zero, then Equation (3) can be formulated as:

$$\text{diag}^{-1}(E_m^{-1})[\text{diag}^{-1}(E_b)]^T = H_{DL}./H_{UL}^T \quad (3)$$

wherein, where $\text{diag}^{-1}(\cdot)$ denotes the operation to transform a diagonal matrix to a column vector, and ./ denotes matrix dot-division.

Take logarithm on both sides and move the right side to the left, then the linear equation can be formulated into the form of $AX=0$. The solvability of this matrix equation is determined by the rank of its coefficient matrix, $$A_{(M \times N) \times (M+N)} = \begin{bmatrix} 1_{N \times 1} & 0_{N \times 1} & \ldots & 0_{N \times 1} & I_{N \times N} \\ 0_{N \times 1} & 1_{N \times 1} & \ldots & 0_{N \times 1} & I_{N \times N} \\ \vdots & \vdots & \ldots & \vdots & \vdots \\ 0_{N \times 1} & 0_{N \times 1} & \ldots & 1_{N \times 1} & I_{N \times N} \end{bmatrix} \quad (4)$$

where $1_{N \times 1}$ or $0_{N \times 1}$ is a column vector with N all one or zero elements, respectively, and $I_{N \times N}$ is an entity matrix with dimension N×N. By using mathematical induction method, it can be proved that:

$$\text{rank}(A) = M + N - 1 \quad (5)$$

By selecting $e_{m,1}$ as reference, the eNB side reciprocity errors can be defined as, $$\begin{cases} e_{b,1} = e_{m,1} h_{ul,11}^{-1} h_{dl,11} \\ e_{b,2} = e_{m,1} h_{ul,12}^{-1} h_{dl,12} \\ \cdots \\ e_{b,N} = e_{m,1} h_{ul,1N}^{-1} h_{dl,1N} \end{cases} \quad (6)$$

By also selecting $e_{m,1}$ as reference, the UE side reciprocity errors can be defined as, $$\begin{cases} e_{m,1}^{-1} = e_{m,1}^{-1} \\ e_{m,2}^{-1} = e_{m,1}^{-1} h_{dl,11}^{-1} h_{ul,11} h_{ul,21}^{-1} h_{dl,21} \\ \cdots \\ e_{m,M}^{-1} = e_{m,1}^{-1} h_{dl,11}^{-1} h_{ul,11} h_{ul,M1}^{-1} h_{dl,M1} \end{cases} \quad (7)$$

With the eNB/UE side reciprocity errors both expressed in $e_{m,1}$, the eNB calibration weight can be calculated according to following formulation, $$w_{b,j} = e_{b,j}^{-1}, j=1,\ldots,N$$

The calibration weight of the calibrating UE is:

$$w_{m,i} = e_{m,i}, i=1,\ldots,M$$

And the calibration operation can be expressed as, $$H_{UL,cal}^T = W_m H_{UL}^T W_b \quad (8)$$

wherein:

$$W_m = \text{diag}(w_{m,1}, w_{m,2}, \ldots, w_{m,M})$$

$$W_b = \text{diag}(w_{b,1}, w_{b,2}, \ldots, w_{b,N}).$$

It can be noted from Equation (7) that, only one UE antenna is needed for performing relative eNB antenna calibration. For performance enhancement, an average, from a plurality of UE antennas, can be taken on the estimation of $E_b$. But the condition is that a common eNB antenna should be used as reference in the estimation of $E_b$ with different UE antennas. Similar average operation can be taken in the calibration of UE side antennas.

Figure 2:
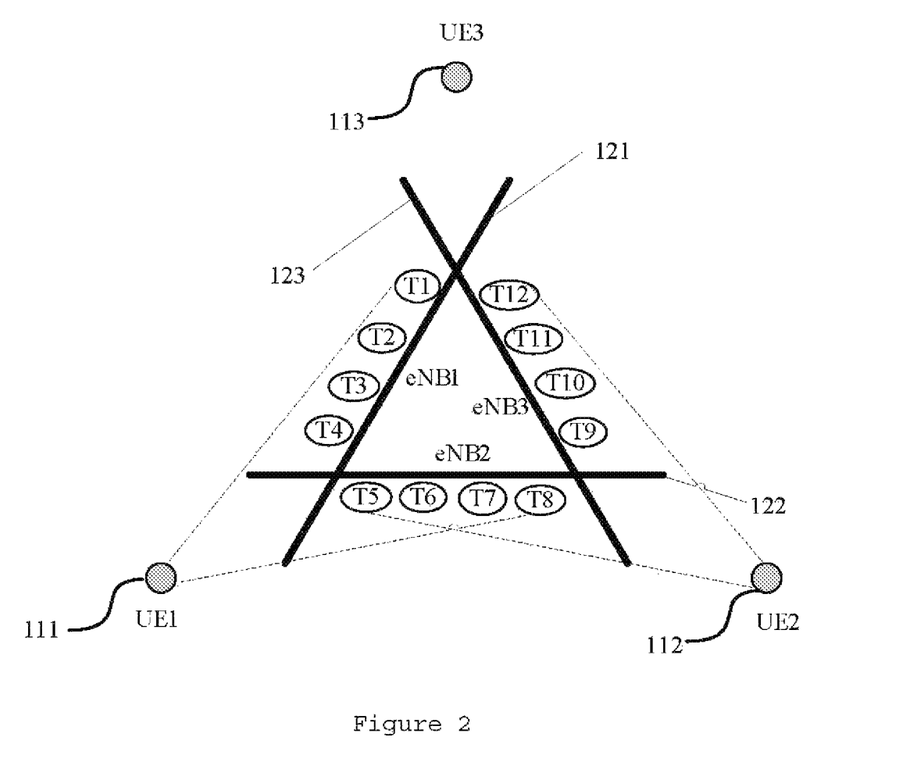
FIG. 2 illustrates the topology schematic diagram between a plurality of UEs and CoMP base stations according to one embodiment of the present invention.

FIG. 2 illustrates the topology schematic diagram between a plurality of UEs and CoMP base stations according to one embodiment of the present invention. Therein is included a base station 121, a base station 122, a base station 123, in the figure, and the above three base stations are configured to perform intra-site CoMP, and participate in reciprocity calibration. Wherein, the base station 121 is equipped with antennas T1, T2, T3, T4, the base station 122 is equipped with antennas T5, T6, T7, T8, and the base station 123 is equipped with antennas T9, T10, T11, T12. The base station 121, the base station 122 and the base station 123 have three UEs in their belonging coverage: UE111, UE112, UE113. And the above three UEs are capable of providing OTA calibration measurement. Without loss of generality, herein, supposing that each UE is equipped with one antenna, then the number of antennas is actually the number of UEs.

Figure 3:
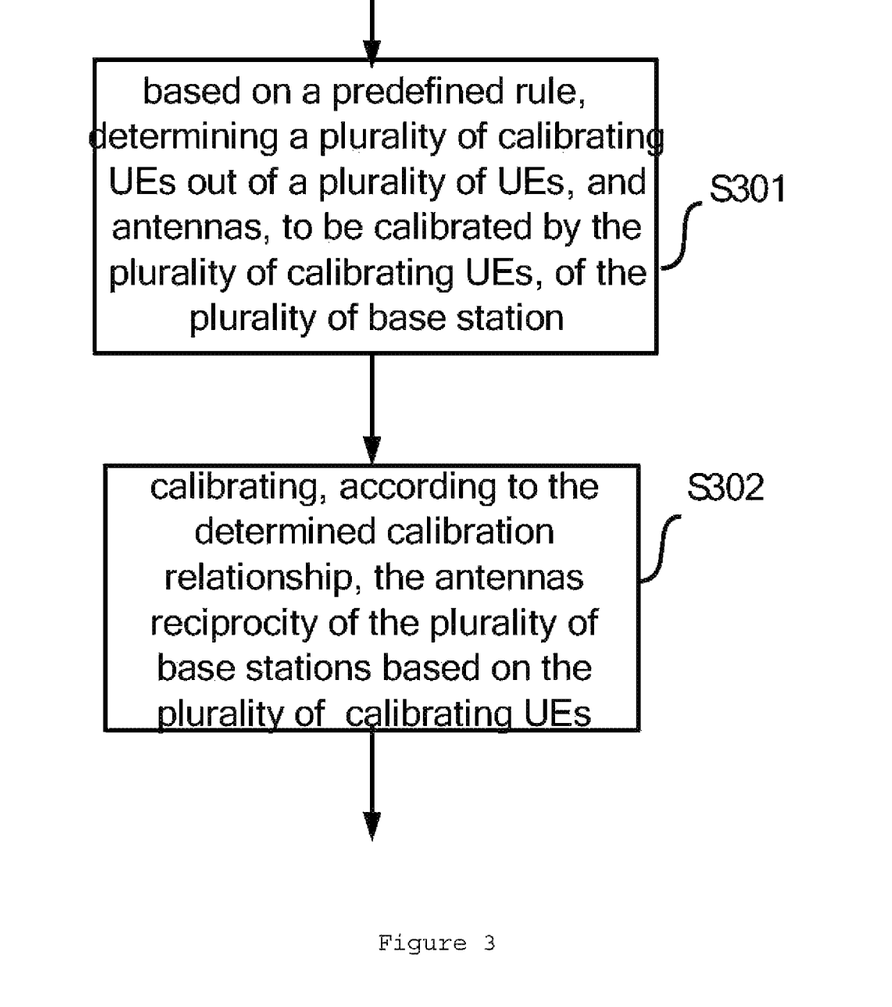
FIG. 3 illustrates the flow chart of a method of calibrating antennas reciprocity according to one embodiment of the present invention.

FIG. 3 illustrates the flow chart of a method of calibrating antennas reciprocity according to one embodiment of the present invention. The method as shown in the figure comprises a step of S301 for determining calibrating UE and calibration relationship between the calibrating UE and CoMP base station, a step of S302 for calibrating antennas reciprocity.

In step S301, the base station 121, the base station 122, the base station 123 or the combination thereof determine, based on a predefined rule, a plurality of calibrating UEs out of a plurality of UEs, and the plurality of base stations' antennas to be calibrated by the plurality of calibrating UEs, wherein, the plurality of calibrating UEs are configured to calibrate the antennas of the plurality of base stations, and the predefined rule is: the number L of the plurality of calibrating UEs, the number K of antennas, configured for the plurality of base stations, calibrated by each calibrating UE of the plurality of calibrating UEs, and the number M of the antennas of the plurality of base stations satisfy the relation of $KL \geq M+L-1$; and channel quality criteria between the plurality of calibrating UEs and the antennas configured for the plurality of base stations is above a threshold.

For instance, the base station 121, the base station 122, the base station 123 or the combination thereof may select two or three UEs as calibrating UEs which are used during calibration, based on a predefined rule in this embodiment.

Meanwhile, according to the predefined rule given foregoing, those skilled in the art should appreciated, by means of enumeration, calibrating UE(s) satisfying the predefined rule could be selected and the number of antennas, of the base station 121, the base station 122, the base station 123, to be calibrated by the calibrating UE(s) could be determined.

The conventional calibration method requires all the channels from certain UE's antenna to the twelve eNB antennas, of the three base stations as shown in FIG. 2, are sufficiently good in quality. But obviously, a UE, for example UE1, is out of the coverage of base station 3, thus the channel quality from the UE1 to the base station 3 could be poor.

Herein, in the above embodiment, the coefficient matrix (4) of equation (3) needs to be revised. Assume all UE antennas calibrate the same number of eNB antennas while all eNB antennas are calibrated by the same number of UE antennas. Let K denote the number of eNB antennas calibrated by each UE, and L denote the number of UE antennas for calibrating each eNB antenna. To guarantee the relative calibration is still feasible for the M eNB antennas and the N UE antennas, the rank of the coefficient matrix (4) needs to be maintained, e.g., the following relations should satisfy:

$$KL \geq M+L-1 \quad (9)$$

Thus K and L should be natural number and satisfy:

$$K \geq \frac{M+L-1}{L} \quad (10)$$

Or equivalently, $$L \geq \frac{M-1}{K-1} \quad (11)$$

Equation (10) gives the minimum number of eNB antennas to be calibrated by each UE antenna when the number of calibrating UE antennas is given, or the minimum number of calibrating UE antennas required when the number of eNB antennas to be calibrated by each calibrating UE is constrained. For instance, the relationship among the number of eNB antennas to be calibrated and the number of antenna of the calibrating UE, the minimum number of eNB antennas to be calibrated by antenna of each calibrating UE may be given in the form listed by the table 3. Of course, more combinations with equation (9) met could be derived by means of exhaustion method.

TABLE 3

Illustration of minimum number of eNB or UE antennas for network calibration when a plurality of calibrating UEs calibrate CoMP base station

| Number of eNB Antennas To Be Calibrated (M) | Number of Calibrating UE Antennas (L) | Minimum Number of eNB Antennas Calibrated by Each UE Antenna (K) |
|---|---|---|
| 12 | 1 | 12 |
| 12 | 2 | 7 |
| 12 | 3 | 5 | a) Given the number of UE antennas involved in the calibration

| Number of eNB Antennas To Be Calibrated (M) | Number of eNB Antennas Calibrated by Each UE Antenna (K) | Number of Calibrating UE Antennas (L) |
|---|---|---|
| 12 | 12 | 1 |
| 12 | 8 | 2 | b) Given the number of eNB antennas to be calibrated for each UE antenna

As for the above table 3, it should be noted that: when a plurality of UE antennas are involved in the OTA calibration, an eNB antenna does not need to be calibrated by all UE antennas in the case that the predefined rule in equation (9) is met.

Additionally, the criteria for channel quality involved in the predefined rule of step S301 comprises, but not limited to at least one of the following: signal-to-noise ratio, signal to interference noise ratio, the number of notification of ACK/NACK of Automatic Feedback Repeat. For example, the criteria for channel quality may be that signal to interference noise ratio of channel is greater than 10 dB.

In every possible scheme candidate achieved via equation (9) by means of enumeration in table (3), it is assumed that the last scheme in table 3 (b) is adopted for the above embodiment, namely, "the minimum number K of eNB antennas calibrated by each UE antenna" is 8, while "the number L of calibrating UE antennas" is 2.

Furthermore, it is assumed that UE111 and UE112 are determined to be calibrating UEs according to the criteria for channel quality that signal to interference noise ratio of channel is greater than 10 dB, yet UE113 does not participate in calibration due to the deficiency of the criteria for channel quality.

Meanwhile, with "minimum number K of eNB antennas calibrated by each UE Antenna" being 8, there might exist various calibration relationship between UE111, UE112 and antennas T1~T12 configured for the base station 121, the base station 122 and the base station 123. Herein, with the factor of channel quality taken into consideration, without loss of generality, the calibration relationship could be determined to be that: UE111 calibrates antennas T1~T8, and UE112 calibrates antennas T5~T12.

In step S302, based on the plurality of calibrating UEs, the base station 121, the base station 122 and the base station 123 or the combination thereof calibrates, according to the determined calibration relationship, the antennas reciprocity of the plurality of base stations. For instance, first, the base station 121, the base station 122 and the base station 123 or the combination thereof, determines the ratio of the reciprocity error of the twelve antennas T1~T12 of the base station 121, the base station 122 and the base station 123 relative to that of any antenna, wherein the any antenna may be anyone antenna configured for the base station or UE within such calibration system. Subsequently, in accordance with such ratio, to generate a calibration weight matrix for the uplink channel on the base station side, and determine the calibrated transposed matrix for the uplink channel according to the generated calibration weight matrix for the uplink channel on the base station side and the transposed matrix for the uplink channel, such that reciprocity error of antennas of the base station system is calibrated for the base station 121, the base station 122 and the base station 123 or the combination thereof with the above the transposed matrix for the uplink channel calibrated, thereby the performance of subsequent precoding, MIMO processing or beamforming is enhanced.

Figure 4:
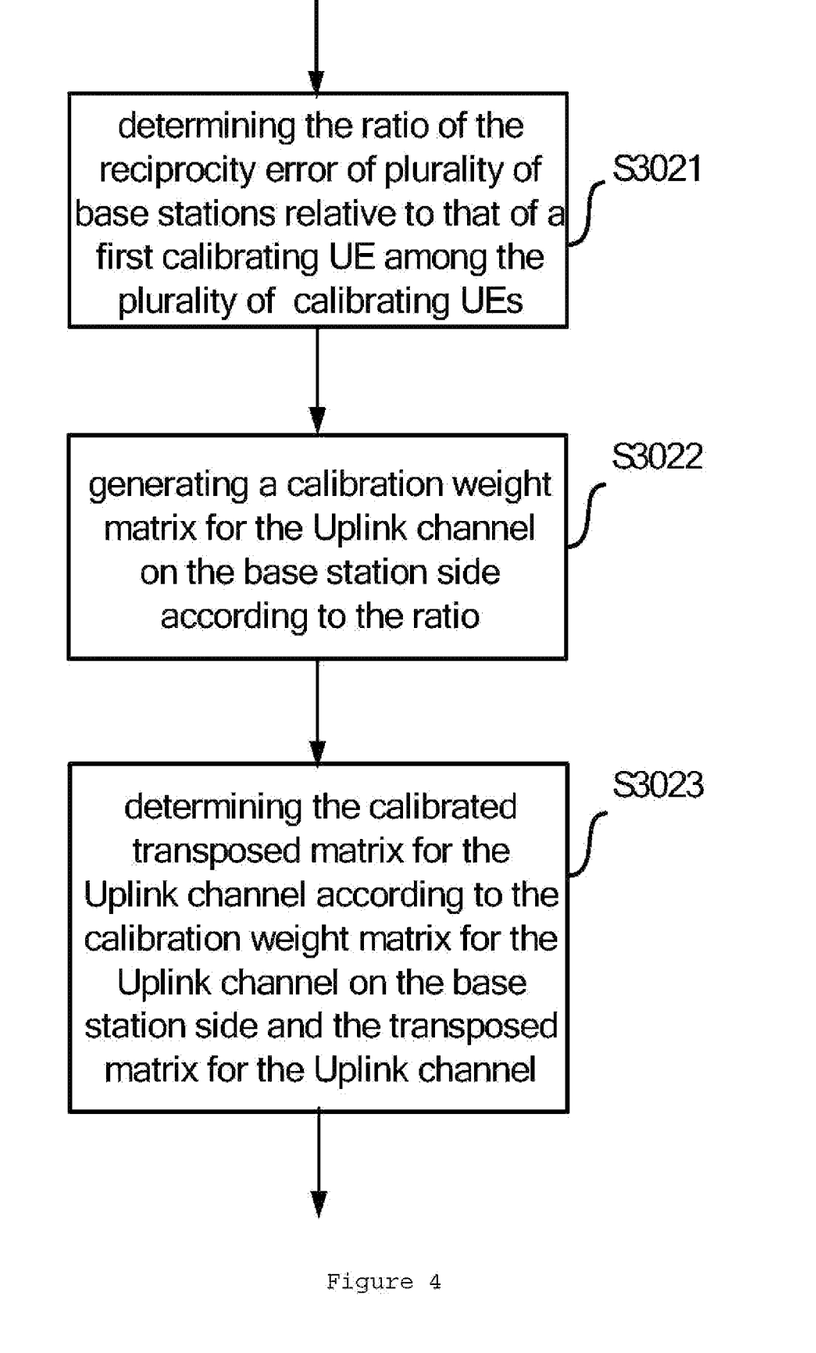
FIG. 4 illustrates the flow chart of the calibrating step for a method of calibrating antennas reciprocity according to one embodiment of the present invention.

FIG. 4 illustrates the flow chart of the calibrating step for a method of calibrating antennas reciprocity according to one embodiment of the present invention. As shown in the Figure, the calibrating step S302 specifically comprises the step S3021 of ratio-determining of the reciprocity-error of base station to that of calibrating UE, the step S3022 of generating calibration weight matrix, the step S3033 of determining the transposed matrix for the uplink channel.

In step S3021, according to the ratio of the reciprocity error of a plurality of base stations to that of a plurality of calibrating UEs, to determine the ratio of the reciprocity error of the plurality of base stations respectively to that of a first calibrating UE among the plurality of calibrating UEs.

In such embodiment, according to the ratio of the reciprocity error of antennas configured for the base station 121, the base station 122 and the base station 123 to the reciprocity error of the two calibrating UEs UE111 and UE112, the base station 121, the base station 122 and the base station 123 or the combination thereof collaboratively determines, respectively or collaboratively, the ratio of the reciprocity error of antennas of the base station 121, the base station 122 and the base station 123 relative to reciprocity error of antenna of UE111. Certainly, the base station 121, the base station 122 and the base station 123 or the combination thereof collaboratively may alternatively determine the ratio of the reciprocity error of antennas of the base station 121, the base station 122 and the base station 123 relative to reciprocity error of antenna of UE112.

By selection of the reciprocity error $e_{m,1}$ of UE111 and the reciprocity error $e_{m,2}$ of UE112 as reference, the reciprocity errors of the antennas of the base station 121, the base station 122 and the base station 123 may be expressed respectively as following equation:

$$\begin{cases} e_{b,1} = e_{m,1} h_{ul,11}^{-1} h_{dl,11} \\ e_{b,2} = e_{m,1} h_{ul,12}^{-1} h_{dl,12} \\ \ldots \\ e_{b,5} = e_{m,1} h_{ul,15}^{-1} h_{dl,15} \\ \ldots \\ e_{b,8} = e_{m,1} h_{ul,18}^{-1} h_{dl,18} \end{cases} \quad \begin{cases} e_{b,5} = e_{m,2} h_{ul,25}^{-1} h_{dl,25} \\ e_{b,6} = e_{m,2} h_{ul,26}^{-1} h_{dl,26} \\ \ldots \\ e_{b,9} = e_{m,2} h_{ul,29}^{-1} h_{dl,29} \\ \ldots \\ e_{b,12} = e_{m,2} h_{ul,212}^{-1} h_{dl,212} \end{cases} \quad (12)$$

From the two set in equation (12), it could be derived of:

$$e_{b,j} = \begin{cases} e_{m,1} h_{ul,1j}^{-1} h_{dl,1j}, & j = 1, \ldots 8 \\ \eta e_{m,1} h_{ul,2j}^{-1} h_{dl,2j}, & j = 9, \ldots, 12 \end{cases} \quad (13)$$

-continued wherein, $$\eta = \frac{1}{4}\sum_{j=5}^{8} h_{ul,1,j}^{-1} h_{dl,1,j} h_{dl,2,j}^{-1} h_{ul,2,j}.$$

Thus, in such embodiment, the reciprocity of the base station 121, the base station 122 and the base station 123 could be calibrated with calibration weights relative to reciprocity error of UE111:

$$w_{b,j} = \begin{cases} h_{ul,1,j}^{-1} h_{dl,1,j}, & j=1,\ldots 8 \\ \eta h_{ul,2,j}^{-1} h_{dl,2,j}, & j=9,\ldots,12 \end{cases}$$

In step S3022, to generate a calibration weight matrix for the uplink channel on the base station side according to the ratio of the reciprocity error of a plurality of base stations relative to that of the first calibrating UE among a plurality of calibrating UEs.

In the above embodiment, according to the ratio of the reciprocity error of antennas employed by the base station 121, the base station 122 and the base station 123 relative to reciprocity error of calibrating UE111, the base station 121, the base station 122, the base station 123 or the combination thereof collaboratively generate a calibration weight matrix for the uplink channel on base station side by utilization of the above weight, shown as following equation:

$$W_b = \mathrm{diag}(w_{b,1}, w_{b,2}, \ldots, w_{b,12}) \qquad (14)$$

Next, in step S3023, to determine a calibrated transposed matrix for the uplink channel according to the calibration weight matrix for the uplink channel on the base station side and the transposed matrix for the uplink channel.

For instance, the calibrated transposed matrix for the uplink channel may be determined according to the following equation:

$$H_{UL,cal}{}^T = H_{UL}{}^T W_b,$$

wherein, $H_{UL,cal}{}^T$ denotes the calibrated transposed matrix for the uplink channel which is determined as above, $H_{UL}{}^T$ denotes the transposed matrix for the uplink channel before calibration, $W_b$ denotes the calibration weight matrix for the uplink channel on base station side.

In another embodiment of the present invention, prior to step S3022, such method further comprises a step that a plurality of base stations conduct self-calibration respectively, and the step S3022 further comprises a step of averaging respectively uplink channel's calibration weight corresponding to antennas respectively configured for each base station among the plurality of base stations, with the above calibration weight to be averaged being an element of the calibration weight matrix for the uplink channel on the base station side, and substitute the resulting average value for the uplink channel's calibration weight corresponding to antennas respectively configured for each base station among the plurality of base stations so as to generate a average calibration weight matrix for the uplink channel on the base station side. Subsequently, step S3023 further comprises a step of determining the calibrated transposed matrix for the uplink channel according to the average calibration weight matrix and the transposed matrix for the uplink channel on the base station side.

Prior to step S3022 of such embodiment, the base station 121, the base station 122, the base station 123 may respectively conduct self-calibration. In response to the self-calibration of above base stations, in step S3022, the base station 121, the base station 122, the base station 123 or the combination thereof average the weight value of the three vectors of $(W_{b,1}, W_{b,2}, W_{b,3}, W_{b,4})$, $(W_{b,5}, W_{b,6}, W_{b,7}, W_{b,8})$ and $(W_{b,9}, W_{b,10}, W_{b,11}, W_{b,12})$ in equation (14), and substitute the three average values of $w_{b,\overline{1234}}$, $w_{b,\overline{5678}}$, $w_{b,\overline{9\to12}}$ for corresponding weight respectively so as to generate the average calibration weight matrix for the uplink channel on the base station side, shown as follows:

$$\overline{W}_b = \mathrm{diag}(w_{b,\overline{1234}}, w_{b,\overline{1234}}, w_{b,\overline{1234}}, w_{b,\overline{1234}}, w_{b,\overline{5678}}, \ldots,$$
$$w_{b,\overline{5678}}, w_{b,\overline{9\to12}}, w_{b,\overline{9\to12}}, w_{b,\overline{9\to12}}, w_{b,\overline{9\to12}},$$

subsequently, in step S3023, to determine the calibrated transposed matrix for the uplink channel according to the calibration weight matrix $\overline{w}_b$ for the uplink channel on the base station side and the transposed matrix for the uplink channel.

For instance, the calibrated transposed matrix for the uplink channel may be determined according to the following equation:

$$H_{UL,cal}{}^T = H_{UL}{}^T \overline{W}_b,$$

wherein, $H_{UL,cal}{}^T$ denotes the calibrated transposed matrix determined for the uplink channel, $H_{UL}{}^T$ denotes the transposed matrix for the uplink channel before calibration.

Optionally, the step S302 further comprises a step of generating a calibration weight matrix for the uplink channel on the UE side according to the ratio of the reciprocity error of the first calibrating UE among the plurality of calibrating UEs relative to that of the plurality of base stations. For example, by selection of the reciprocity error $e_{b,1} \sim e_{b,12}$ of antennas T1~T12 employed by the base station 121, the base station 122, the base station 123 as reference, the reciprocity error of antennas equipped in calibrating UE111 and UE112, may be respectively represented, for example:

$$\begin{cases} e_{m,1} = e_{b,1} h_{ul,11} h_{dl,11}^{-1} \\ \ldots \\ e_{m,2} = e_{b,5} h_{ul,25} h_{dl,25}^{-1} \\ \ldots \end{cases} \qquad (15)$$

Subsequently, formula derivation in the course of generation of calibration weight matrix $W_m$ for the uplink channel on UE side is similar to the formula derivation from equation 13 to equation 14, so no redundant description is made herein.

Next, in step S3023, to determine the calibrated transposed matrix for the uplink channel according to the calibration weight matrix $W_b$, the transposed matrix for the uplink channel on the base station side, and the calibration weight matrix $W_m$ for the uplink channel on the UE side. For example, the calibrated transposed matrix for the uplink channel may be further determined according to the following equation:

$$H_{UL,cal}{}'^T = W_m H_{UL}{}^T W_b$$

wherein, $H_{UL,cal}{}'^T$ denotes the calibrated transposed matrix for the uplink channel which is further determined, $H_{UL}{}^T$ denotes the transposed matrix for the uplink channel before calibration, $W_m$ denotes the calibration weight matrix for the uplink channel on the UE side, $W_b$ denotes the calibration weight matrix for the uplink channel on the base station side.

In such embodiment, for step S3021, the ratio of the reciprocity error of a plurality of base stations relative to that of a plurality of calibrating UEs may be the ratio of the downlink channel response relative to uplink channel response between corresponding base station and calibrating UE, as shown in equation 12, optionally, prior to the step S3021, such method further comprises the steps that, the base station 121, the base station 122, the base station 123 respectively or collaboratively transmits a signaling to the plurality of calibrating UEs, for example UE111 and UE112, wherein the signaling is used for instructing UE111 and UE112 to send measurement values of the downlink channel response, for example $h_{dl,11}$, $h_{dl,25}$ in equation 12 and so on, respectively measured by UE111 and UE112, to the plurality of base stations. And correspondingly, the base station 121, the base station 122, the base station 123 receives a signaling from the plurality of calibrating UEs, for example UE111 and UE112, wherein the signaling comprises the measurement value of the downlink channel response measured by UE111 and UE112.

Optionally, prior to step S3021, the above embodiment further comprises the steps of acquiring the corresponding measurement value, for example $h_{ul,11}$, $h_{ul,25}$ in equation 12 and so on, of the uplink channel response in response to a reference signal from the plurality of calibrating UEs, for example UE111 and UE112, wherein, the reference signal comprises but not limited to sounding reference signal, demodulation reference signal.

Preferable, prior to step S3021, such embodiment of method further comprises the step of receiving a signaling of request for calibration from a UE; or receiving a signaling of cooperative request for calibration from a plurality of UEs. Namely, the calibration conducted by the base station 121, the base station 122 and the base station 123 may be launched by either one single UE or by a plurality of UEs collaboratively. Certainly, the calibration can also be initiated by base station.

In another embodiment of the present invention, step S302 may further comprises a step of determining the ratio of the reciprocity error of a plurality of base stations relative to that of a first antenna among the antennas configured for the plurality of base stations according to the ratio of reciprocity error of the plurality of base stations to that of a plurality of calibrating UEs.

For example, the first part of equation 12 can be transformed as follows:

$$e_{b,1} = w_{m,1} h_{ul,11}^{-1} h_{dl,11} \Rightarrow e_{m,1} = e_{b,1} h_{ul,11} h_{dl,11}^{-1} \quad (15)$$

By introducing the above transformed equation 15 into equation 13, to determine the ratio of the reciprocity error of the twelve antennas T1~T12 of the base station 121, the base station 122 and the base station 123 relative to that of antennas T1 out of all the antennas employed by the base station 121, the base station 122 and the base station 123, and no redundant description will be made herein.

Furthermore, the base station 121, the base station 122 and the base station 123 may generate a calibration weight matrix for the uplink channel on the base station side according to the ratio of the reciprocity error of antennas T1~T12 configured for the above three base stations relative to that of a first antenna of all the antennas configured for the three base stations in such embodiment, for example the first antenna may be antennas T1 in this embodiment. And such step is similar to the step S3022 in the embodiment shown in FIG. 4, and no redundant description needs to be made herein.

Next, the base station 121, the base station 122 and the base station 123 determines the calibrated transposed matrix for the uplink channel according to the calibration weight matrix for the uplink channel on the base station side and the transposed matrix for the uplink channel. And no redundant description needs to be made herein.

Herein, those skilled in the art could readily appreciate: reciprocity error of above base station(s) may actually be the reciprocity error of antennas configured for base station(s), likewise, reciprocity error of UE may actually be the reciprocity error of antennas employed by UE.

Figure 5:
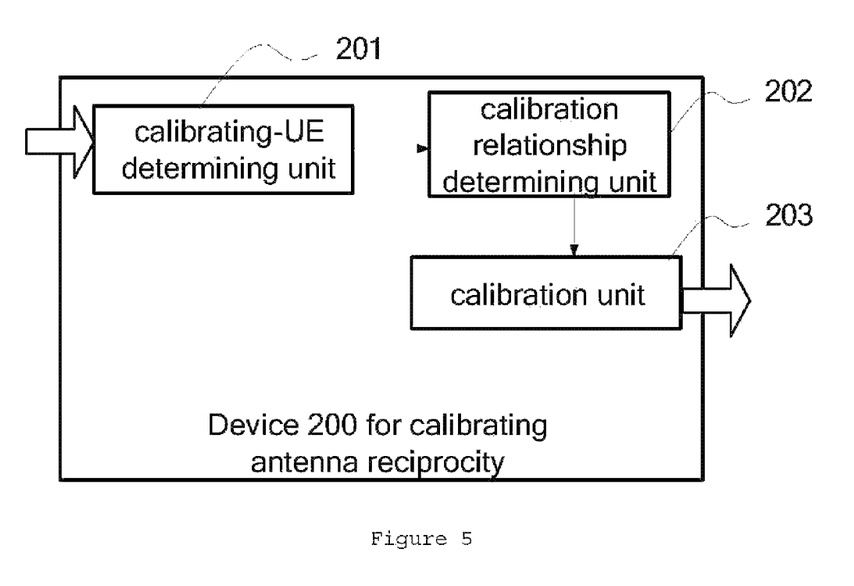
FIG. 5 illustrates the block diagram of a device for calibrating antennas reciprocity according to one embodiment of the present invention.

FIG. 5 illustrates the block diagram of a device 200 for calibrating antennas reciprocity according to one embodiment of the present invention. Device 200 comprises a calibrating-UE determining unit 201, a calibration relationship determining unit 202 and a calibration unit 203.

Wherein, a plurality of base stations are configured to conduct CoMP. The above calibrating-UE determining unit 201 is configured to determine, based on a first predefined rule, antennas of a plurality of calibrating user equipments out of a plurality of user equipments, wherein the antennas of the plurality of calibrating user equipments are configured to calibrate antennas of the plurality of base stations and the first predefined rule is that the criteria for channel quality between the plurality of calibrating user equipments and the antennas configured for said plurality of base stations is above a threshold.

The calibration relationship determining unit 202 is configured to determine, based on a second predefined rule, antennas, to be calibrated respectively by the antennas of the plurality of calibrating user equipments, of the plurality of base stations, wherein the second predefined rule is that the number L of the antennas of the plurality of calibrating user equipments, the number K of antennas configured for the plurality of base stations and to be calibrated by the antenna of each of the plurality of calibrating user equipments, and the number M of the antennas of the plurality of base stations satisfy the relation of KL≥M+L−1.

The calibration unit 203 is configured to calibrate, according to the determined calibration relationship, the antennas reciprocity of the plurality of base stations based on the plurality of calibrating user equipments.

In such embodiment, the calibrating-UE determining unit 201 may select two or three UEs as calibrating UEs used on occurrence of calibration based on a predefined rule in such an embodiment.

Meanwhile, according to the predefined rule given foregoing, those skilled in the art should appreciated, according to formula KL≥M+L−1, by means of enumeration, calibrating UE satisfying the predefined rule could be selected and the number of antennas, of the base station 121, the base station 122 and the base station 123, for the calibrating UE to calibrate could be determined.

Additionally, as a basis of calibrating-UE determining unit 201, the criteria of channel quality involved in the predefined rule of step S301 comprises, but not limited to at least one of the following: signal-to-noise ratio, signal to interference noise ratio, the number of notification of ACK/NACK of Automatic Feedback Repeat. For example, the criteria for channel quality may be that signal to interference noise ratio of channel is greater than 10 dB.

In another embodiment of the present invention, the calibration unit 203 further comprises a first reciprocity-error ratio determining unit, a first BS-side uplink-channel calibration-weight-matrix generating unit, and a first uplink-channel transposed matrix generating unit.

The first reciprocity-error ratio determining unit is configured to determine the ratio of reciprocity error of the plurality of base stations relative to that of a first one among the plurality of calibrating user equipments, according to the ratio of the reciprocity error of the plurality of base stations to that of the plurality of calibrating user equipments.

The first BS-side uplink-channel calibration-weight-matrix generating unit is configured to generate a calibration weight matrix for the uplink channel on the base station side, according to the ratio of the reciprocity error of the plurality of base stations relative to that of the first one among the plurality of calibrating user equipments;

The first uplink-channel transposed matrix generating unit is configure to determine a calibrated transposed matrix for the uplink channel, according to the calibration weight matrix for the uplink channel on the base station side and a transposed matrix for the uplink channel.

In such embodiment, according to the ratio of the reciprocity error of antennas configured for the base station 121, the base station 122 and the base station 123 to the reciprocity error of the two calibrating UEs of calibrating UE111 and UE112, the first reciprocity-error ratio determining unit determines the ratio of the reciprocity error of antennas of the base station 121, the base station 122 and the base station 123 relative to reciprocity error of antenna employed by UE111. Certainly, the base station 121, the base station 122, the base station 123 or the combination thereof collaboratively may alternatively determine the ratio of the reciprocity error of antennas of the base station 121, the base station 122 and the base station 123 relative to reciprocity error of antenna employed by UE112.

By selection of the reciprocity error $e_{m,1}$ of UE111 and the reciprocity error $e_{m,2}$ of UE112 as reference, the reciprocity errors of the antennas employed by the base station 121, the base station 122 and the base station 123 may be expressed respectively as following equation:

$$\begin{cases} e_{b,1} = e_{m,1}h_{ul,11}^{-1}h_{dl,11} \\ e_{b,2} = e_{m,1}h_{ul,12}^{-1}h_{dl,12} \\ \ldots \\ e_{b,5} = e_{m,1}h_{ul,15}^{-1}h_{dl,15} \\ \ldots \\ e_{b,8} = e_{m,1}h_{ul,18}^{-1}h_{dl,18} \end{cases} \quad \begin{cases} e_{b,5} = e_{m,2}h_{ul,25}^{-1}h_{dl,25} \\ e_{b,6} = e_{m,2}h_{ul,26}^{-1}h_{dl,26} \\ \ldots \\ e_{b,9} = e_{m,2}h_{ul,29}^{-1}h_{dl,29} \\ \ldots \\ e_{b,12} = e_{m,2}h_{ul,212}^{-1}h_{dl,212} \end{cases} \quad (142')$$

From the two set in equation (12), it could be derived of:

$$e_{b,j} = \begin{cases} e_{m,1}h_{ul,1j}^{-1}h_{dl,1j}, & j = 1, \ldots 8 \\ \eta e_{m,1}h_{ul,2j}^{-1}h_{dl,2j}, & j = 9, \ldots, 12 \end{cases} \quad (153')$$

wherein, $$\eta = \frac{1}{4}\sum_{j=5}^{8} h_{ul,1,j}^{-1}h_{dl,1,j}h_{dl,2,j}^{-1}h_{ul,2,j}.$$

Thus, in such embodiment, the reciprocity of the base station 121, the base station 122 and the base station 123 could be calibrated with calibration weights relative to reciprocity error of UE111:

$$w_{b,j} = \begin{cases} h_{ul,1j}^{-1}h_{dl,1j}, & j = 1, \ldots 8 \\ \eta h_{ul,2j}^{-1}h_{dl,2j}, & j = 9, \ldots, 12 \end{cases}$$

Subsequently, according to the ratio of the reciprocity error of antennas employed by the base station 121, the base station 122 and the base station 123 relative to reciprocity error of calibrating UE111, the first BS-side uplink-channel calibration-weight-matrix generating unit generate a calibration weight matrix for the uplink channel on the Base station side by utilization of the above weight, shown as following equation:

$$W_b = \text{diag}(w_{b,1}, w_{b,2}, \ldots, w_{b,12}) \quad (14')$$

Next, the first uplink-channel transposed matrix generating unit may determine a calibrated transposed matrix for the uplink channel, for example according to the following equation:

$$H_{UL,cal}^T = H_{UL}^T W_b$$

wherein, $H_{UL,cal}^T$ denotes the calibrated transposed matrix determined for the uplink channel, $H_{UL,cal}^T$ denotes the transposed matrix for the uplink channel before calibration, $W_b$ denotes the calibration weight matrix for the uplink channel on the base station side.

Optionally, device 200 further comprises a UE-side uplink-channel calibration-weight-matrix generating unit.

The UE-side uplink-channel calibration-weight-matrix generating unit is configured to generate a calibration weight matrix for the uplink channel on the user equipment side, according to the ratio of the reciprocity error of the first one among the plurality of calibrating user equipments relative to that of the plurality of base stations.

Meanwhile, The first uplink-channel transposed matrix generating unit is further configure to determine the calibrated transposed matrix for the uplink channel, according to the calibration weight matrix for the uplink channel on the base station side, the transposed matrix for the uplink channel, and the calibration weight matrix for the uplink channel on the user equipment side.

For example, by selection of the reciprocity error $e_{b,1} \sim e_{b,12}$ of antennas T1~T12 employed by the base station 121, the base station 122 and the base station 123 as reference, the reciprocity error of antennas equipped in calibrating UE111 and UE112, may be respectively represented, for example:

$$\begin{cases} e_{m,1} = e_{b,1}h_{ul,11}h_{dl,11}^{-1} \\ \ldots \\ e_{m,2} = e_{b,5}h_{ul,25}h_{dl,25}^{-1} \\ \ldots \end{cases} \quad (15')$$

Subsequently, formula derivation in the course of generation of calibration weight matrix $W_m$ for the uplink channel on UE side is similar to the formula derivation from equation 13' to equation 14', so no more redundant description is presented herein.

Next, the first uplink-channel transposed matrix generating unit determines the calibrated transposed matrix for the uplink channel according to the calibration weight matrix $W_b$, the transposed matrix for the uplink channel on the base station side, and the calibration weight matrix $W_m$ for the uplink channel on the UE side. For example, the calibrated transposed matrix for the uplink channel may be further determined according to the following equation:

$$H_{UL,cal}'^T = W_m H_{UL}^T W_b$$

wherein, $H_{UL,cal}'^T$ denotes the further calibrated transposed matrix for the uplink channel which is further determined, $H_{UL,cal}^T$ denotes the transposed matrix for the uplink channel before calibration, $W_m$ denotes the calibration weight matrix for the uplink channel on the UE side, $W_b$ denotes the calibration weight matrix for the uplink channel on the base station side.

In still another embodiment of the present invention, the calibration unit 203 further comprises a second reciprocity-error ratio determining unit, a second BS-side uplink-channel calibration-weight-matrix generating unit, and a second uplink-channel transposed matrix generating unit.

The second reciprocity-error ratio determining unit is configured to determine the ratio of reciprocity error of the plurality of base stations relative to that of a first antenna among the antennas configured for the plurality of base stations, according to the ratio of the reciprocity error of the plurality of base stations to that of the plurality of calibrating user equipments.

The second BS-side uplink-channel calibration-weight-matrix generating unit is configured to generate a calibration weight matrix for the uplink channel on the base station side, according to the ratio of the reciprocity error of the plurality of base stations relative to that of the first antenna among the antennas configured for the plurality of base stations.

The second uplink-channel transposed matrix generating unit is configured to determine a calibrated transposed matrix for the uplink channel, according to the calibration weight matrix for the uplink channel on the base station side and a transposed matrix for the uplink channel.

For example, the second reciprocity-error ratio determining unit may determine the ratio of the reciprocity error of antennas T1~T12 relative to the reciprocity error of certain antenna of all antennas T1~T12, by means of equation 12', namely, the ratio of the reciprocity error of antennas T1~T12 of the base station 121, the base station 122 and the base station 123 relative to the reciprocity error of antennas configured for UE111, UE112 which are used for calibration.

For example, the first part of equation 12' can be transformed as follows:

$$e_{b,1}=e_{m,1}h_{ul,11}^{-1}h_{dl,11} \Rightarrow e_{m,1}=e_{b,1}h_{ul,11}h_{dl,11}^{-1} \quad (15')$$

By introducing the above transformed equation 15' into equation 13', the ratio of the reciprocity error of the twelve antennas T1~T12 of the base station 121, the base station 122 and the base station 123 relative to that of antennas T1 out of all the antennas employed by the base station 121, the base station 122 and the base station 123 can be determined and no redundant description will be made herein. Of course, herein, those skilled in the art could readily appreciate: T2, T11 or any one of other antennas can be selected as reference to represent the reciprocity error of antennas T1~T12 of the base station 121, the base station 122 and the base station 123, as similar to equation 13'.

Furthermore, the second BS-side uplink-channel calibration-weight-matrix generating unit may generate a calibration weight matrix for the uplink channel on the base station side according to the ratio of the reciprocity error of antennas T1~T12 configured for the above three base stations relative to that of a first antenna of all the antennas configured for the three base stations in such embodiment, for example the first antenna may be antennas T1 in this embodiment.

Subsequently, the second uplink-channel transposed matrix generating unit may determine the calibrated transposed matrix for the uplink channel according to the calibration weight matrix for the uplink channel on the base station side and the transposed matrix for the uplink channel. And no redundant description is needed herein.

Those skilled in the art could readily appreciate, the device in the present invention can be implemented by means of either hardware module, functional module of software, or the hardware module with functional module of software incorporated therein.

Those skilled in the art could readily appreciate, the above embodiment are intended to be exemplary but not limited thereto. Different technical feature in various embodiments can be combined, so as to gain some technical effect. After examining the accompanying figures, specification and claims, those skilled in the art should readily appreciate and carry out some variation for the above disclosed embodiments. In the claims, the term of "comprise" does not exclude the existence of other device(s) or step(s); indefinite article "a/an" does not exclude the "multiple" case; term of "a first", "a second" is just used for give a name rather than for representing some particular order. Figure number(s) in the claims, if any, should not be construed to be any restriction to protection scope. Multiple component functionalities in the claim(s) may be implemented by means of an singular hardware or software. The occurrence of some technical features in different dependent claims does not eliminate the possibility of the technical effect resulting from the combination of these technical features.

What is claimed is:

1. A method of calibrating antenna reciprocity in a base station of wireless network, wherein a plurality of base stations are configured to conduct intra-site cooperative multipoint processing, the method comprising:

determining, based on a predefined rule, a plurality of calibrating user equipments out of a plurality of user equipments, and antennas, to be calibrated by said plurality of calibrating user equipments, of said plurality of base stations, wherein, said plurality of calibrating user equipments are configured to calibrate antennas of said plurality of base stations and said predefined rule is that the number L of antennas of said plurality of calibrating user equipments, the number K of antennas configured for said plurality of base stations and to be calibrated by the antennas of said plurality of calibrating user equipments, and the number M of the antennas of said plurality of base stations satisfy the relation of $KL \geq M+L-1$; and the criteria for channel quality between said plurality of calibrating user equipments and the antennas configured for said plurality of base stations is above a threshold for channel quality;

calibrating, according to the determined calibration relationship, the antennas reciprocity of said plurality of base stations based on said plurality of calibrating user equipments, wherein, said calibration relationship is the correspondence between said plurality of calibrating user equipments and the antennas, to be calibrated respectively by said plurality of calibrating user equipments, of said plurality of base stations, wherein said calibrating further comprises:

determining the ratio of the reciprocity error of said plurality of base stations relative to that of a first one among the antennas configured for said plurality of base stations, according to the ratio of the reciprocity error of said plurality of base stations to that of said plurality of calibrating user equipments;

generating a calibration weight matrix for the uplink channel on said base station side, according to the ratio of the reciprocity error of said plurality of base stations relative to that of said first one among the antennas configured for said plurality of base stations;

determining a calibrated transposed matrix for the uplink channel, according to said calibration weight matrix for the uplink channel on said base station side and a transposed matrix for the uplink channel.

2. The method of claim 1, wherein the criteria for the channel quality comprises at least one of the following:
signal-to-noise ratio
signal to interference noise ratio the number of notification of ACK/NACK of automatic feedback repeat.

3. A method of calibrating antenna reciprocity in a base station of wireless network, wherein a plurality of base stations are configured to conduct intra-site cooperative multi-point processing, the method comprising:

determining, based on a predefined rule, a plurality of calibrating user equipments out of a plurality of user equipments, and antennas, to be calibrated by said plurality of calibrating user equipments, of said plurality of base stations, wherein, said plurality of calibrating user equipments are configured to calibrate antennas of said plurality of base stations and said predefined rule is that the number L of antennas of said plurality of calibrating user equipments, the number K of antennas configured for said plurality of base stations and to be calibrated by the antennas of said plurality of calibrating user equipments, and the number M of the antennas of said plurality of base stations satisfy the relation of $KL \geq M+L-1$; and the criteria for channel quality between said plurality of calibrating user equipments and the antennas configured for said plurality of base stations is above a threshold for channel quality;

calibrating, according to the determined calibration relationship, the antennas reciprocity of said plurality of base stations based on said plurality of calibrating user equipments, wherein, said calibration relationship is the correspondence between said plurality of calibrating user equipments and the antennas, to be calibrated respectively by said plurality of calibrating user equipments, of said plurality of base stations, wherein said calibrating further comprises:

determining the ratio of the reciprocity error of said plurality of base stations relative to that of a first one among said plurality of calibrating user equipments, according to the ratio of the reciprocity error of said plurality of base stations to that of said plurality of calibrating user equipments;

generating a calibration weight matrix for the uplink channel on said base station side, according to the ratio of the reciprocity error of said plurality of base stations relative to that of said first one among said plurality of calibrating user equipments;

determining a calibrated transposed matrix for the uplink channel, according to said calibration weight matrix for the uplink channel on said base station side and a transposed matrix for the uplink channel.

4. The method of claim 3, wherein the method further comprises:

generating a calibration weight matrix for the uplink channel on said user equipment side, according to the ratio of the reciprocity error of said first one among said plurality of calibrating user equipments relative to that of said plurality of base stations;

wherein said determining a matrix further comprises:
determining said calibrated transposed matrix for the uplink channel, according to said calibration weight matrix for the uplink channel on said base station side, said transposed matrix for the uplink channel, and said calibration weight matrix for the uplink channel on said user equipment side.

5. The method of claim 4, wherein said determining a matrix further comprises: further determining a calibrated transposed matrix for the uplink channel according to the following formula, $$H_{UL,cal}^{'T} = W_m H_{UL}^T W_b$$

with $H_{UL,cal}^T$ representing the further determined calibrated transposed matrix for the uplink channel, $H_{UL}^T$ representing said transposed matrix for the uplink channel before calibration, $W_m$ representing said calibration weight matrix for the uplink channel on said user equipment side, $W_b$ representing said calibration weight matrix for the uplink channel on said base station side.

6. The method of claim 3, further comprising:
said plurality of base stations respectively conducting self-calibration further comprising:
respectively averaging uplink channel's calibration weight, corresponding to antennas respectively configured for said plurality of base stations, in said calibration weight matrix for the uplink channel on said base station side, and substituting the average value for the uplink channel's calibration weight corresponding to antennas respectively configured for said plurality of base stations so as to generate an average calibration weight matrix for the uplink channel on said base station side;
said determining a matrix further comprising:
determining said calibrated transposed matrix for the uplink channel, according to said average calibration weight matrix on said base station side and said transposed matrix for the uplink channel.

7. The method of claim 3, further comprising:
receiving a signaling of request for calibration from a user equipment; or
receiving a signaling of cooperative request for calibration from said plurality of user equipments.

8. The method of claim 3, wherein the ratio, of the reciprocity error of said plurality of base stations relative to that of said plurality of calibrating user equipments is the ratio of the downlink channel response relative to the uplink channel response between corresponding base stations and calibrating user equipments, and said method further comprises:
transmitting a signaling to said plurality of calibrating user equipments, wherein the signaling is used for instructing said plurality of calibrating user equipments to respectively send measurement values of the downlink channel response to said plurality of base stations;
receiving a signaling from said plurality of calibrating user equipments, said signaling comprising the measurement values of the downlink channel response measured by said plurality of calibrating user equipments.

9. The method of claim 8, further comprising:
acquiring a corresponding measurement value of the uplink channel response, in response to a reference signal from said plurality of calibrating user equipments.

10. The method of claim 3, wherein said determining a matrix further comprises: determining said calibrated transposed matrix for the uplink channel according to the following formula, $$H_{UL,cal}^T = H_{UL}^T W_b,$$

with $H_{UL,cal}^T$ representing the determined calibrated transposed matrix for the uplink channel, $H_{UL}^T$ representing said transposed matrix for the uplink channel before calibration, $W_b$ representing said calibration weight matrix for the uplink channel on said base station side.

11. A device for calibrating antenna reciprocity in a base station of wireless network, wherein a plurality of base stations are configured to conduct intra-site cooperative multi-point processing, the device configured to:
determine, based on a first predefined rule, antennas of a plurality of calibrating user equipments out of a plurality of user equipments, wherein the antennas of said plurality of calibrating user equipments are configured to calibrate antennas of said plurality of base stations and said first predefined rule is that the criteria for channel quality between said plurality of calibrating user equipments and the antennas configured for said plurality of base stations is above a threshold for channel quality;

determine, based on a second predefined rule, antennas, to be calibrated respectively by the antennas of said plurality of calibrating user equipments, of said plurality of base stations, wherein said second predefined rule is that the number L of the antennas of said plurality of calibrating user equipments, the number K of antennas configured for said plurality of base stations and to be calibrated by the antennas of said plurality of calibrating user equipments, and the number M of the antennas of said plurality of base stations satisfy the relation of KL≥M+L−1;

calibrate, according to the determined calibration relationship, the antennas reciprocity of said plurality of base stations based on said plurality of calibrating user equipments, wherein said calibration relationship is the correspondence between said plurality of calibrating user equipments and the antennas, to be calibrated respectively by said plurality of calibrating user equipments, of said plurality of base stations, wherein said at least one processor is further configured to:

determine the ratio of the reciprocity error of said plurality of base stations relative to that of a first antenna among the antennas configured for said plurality of base stations, according to the ratio of the reciprocity error of said plurality of base stations to that of said plurality of calibrating user equipments;

generate a calibration weight matrix for the uplink channel on said base station side, according to the ratio of the reciprocity error of said plurality of base stations relative to that of said first antenna among the antennas configured for said plurality of base stations;

determine a calibrated transposed matrix for the uplink channel, according to said calibration weight matrix for the uplink channel on said base station side and a transposed matrix for the uplink channel.

12. A device for calibrating antenna reciprocity in a base station of wireless network, wherein a plurality of base stations are configured to conduct intra-site cooperative multipoint processing, the device configured to:

determine, based on a first predefined rule, antennas of a plurality of calibrating user equipments out of a plurality of user equipments, wherein the antennas of said plurality of calibrating user equipments are configured to calibrate antennas of said plurality of base stations and said first predefined rule is that the criteria for channel quality between said plurality of calibrating user equipments and the antennas configured for said plurality of base stations is above a threshold for channel quality;

determine, based on a second predefined rule, antennas, to be calibrated respectively by the antennas of said plurality of calibrating user equipments, of said plurality of base stations, wherein said second predefined rule is that the number L of the antennas of said plurality of calibrating user equipments, the number K of antennas configured for said plurality of base stations and to be calibrated by the antennas of said plurality of calibrating user equipments, and the number M of the antennas of said plurality of base stations satisfy the relation of KL≥M+L−1;

calibrate, according to the determined calibration relationship, the antennas reciprocity of said plurality of base stations based on said plurality of calibrating user equipments, wherein said calibration relationship is the correspondence between said plurality of calibrating user equipments and the antennas, to be calibrated respectively by said plurality of calibrating user equipments, of said plurality of base stations, wherein said at least one processor is configured to:

determine the ratio of the reciprocity error of said plurality of base stations relative to that of a first one among said plurality of calibrating user equipments, according to the ratio of the reciprocity error of said plurality of base stations to that of said plurality of calibrating user equipments;

generate a calibration weight matrix for the uplink channel on said base station side, according to the ratio of the reciprocity error of said plurality of base stations relative to that of said first one among said plurality of calibrating user equipments;

determine a calibrated transposed matrix for the uplink channel, according to said calibration weight matrix for the uplink channel on said base station side and a transposed matrix for the uplink channel.

13. The device of claim 12, wherein said device is configured to:

generate a calibration weight matrix for the uplink channel on said user equipment side, according to the ratio of the reciprocity error of said first one among said plurality of calibrating user equipments relative to that of said plurality of base stations;

determine said calibrated transposed matrix for the uplink channel, according to said calibration weight matrix for the uplink channel on said base station side, said transposed matrix for the uplink channel, and said calibration weight matrix for the uplink channel on said user equipment side.

* * * * *